(12) United States Patent
Bhosale et al.

(10) Patent No.: US 10,518,819 B2
(45) Date of Patent: Dec. 31, 2019

(54) COMPOSITE THERMOPLASTIC STRUCTURE AND COMPOSITE COMPRESSION LIMITER FOR SAME

(71) Applicant: BASF SE, Ludwigshafen (DE)

(72) Inventors: Ankur Bhosale, Canton, MI (US); Kipp Grumm, Novi, MI (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/321,231

(22) PCT Filed: Jun. 29, 2015

(86) PCT No.: PCT/US2015/038328
§ 371 (c)(1),
(2) Date: Dec. 22, 2016

(87) PCT Pub. No.: WO2016/003909
PCT Pub. Date: Jan. 7, 2016

(65) Prior Publication Data
US 2017/0203798 A1    Jul. 20, 2017

Related U.S. Application Data

(60) Provisional application No. 62/019,042, filed on Jun. 30, 2014.

(51) Int. Cl.
*B62D 29/04* (2006.01)
*F16B 19/02* (2006.01)
(Continued)

(52) U.S. Cl.
CPC .............. *B62D 29/041* (2013.01); *B32B 1/08* (2013.01); *B32B 3/06* (2013.01); *B32B 5/12* (2013.01);
(Continued)

(58) Field of Classification Search
CPC ........ B62D 21/02; B62D 21/06; B62D 21/11; B62D 29/041; B60B 3/10; B60B 3/145;
(Continued)

(56) References Cited

U.S. PATENT DOCUMENTS 5,881,610 A    3/1999    Ashkenazi
6,116,113 A    9/2000    Pazdirek et al.
(Continued)

FOREIGN PATENT DOCUMENTS

DE    10 2010 005 005 A1    7/2011
DE    10 2011 005 564 A1    10/2012
(Continued)

OTHER PUBLICATIONS

International Search Report for Application No. PCT/US2015/038328 dated Sep. 28, 2015, 6 pages.
(Continued)

*Primary Examiner* — Joseph D. Pape
*Assistant Examiner* — Dana D Ivey
(74) *Attorney, Agent, or Firm* — DLA Piper LLP (US)

(57) ABSTRACT

A composite compression limiter (44) includes a cylindrical body (46) extending axially with an aperture (48) extending axially therethrough to receive a fastener (18), the body (46) being made of a continuous fiber polymeric tape reinforced by a plurality of fibers ranging from approximately 20% to approximately 65% by weight.

18 Claims, 9 Drawing Sheets

(51) Int. Cl.
  *B32B 5/12* (2006.01)
  *B32B 3/06* (2006.01)
  *B62D 21/02* (2006.01)
  *B32B 1/08* (2006.01)
  *B60B 3/10* (2006.01)
  *B60B 3/14* (2006.01)
  *B62D 21/11* (2006.01)
  *B62D 21/06* (2006.01)

(52) U.S. Cl.
  CPC ............... *B60B 3/10* (2013.01); *B60B 3/145* (2013.01); *B62D 21/02* (2013.01); *B62D 21/11* (2013.01); *F16B 19/02* (2013.01); *B32B 2250/20* (2013.01); *B32B 2260/023* (2013.01); *B32B 2260/046* (2013.01); *B32B 2262/101* (2013.01); *B32B 2262/106* (2013.01); *B32B 2605/08* (2013.01); *B62D 21/06* (2013.01)

(58) Field of Classification Search
  CPC ... F16B 19/02; B32B 1/08; B32B 3/06; B32B 5/12; B32B 2250/20; B32B 2260/023; B32B 2260/046; B32B 2262/101; B32B 2262/106; B32B 2605/08
  USPC ..................................................... 296/193.07
  See application file for complete search history.

(56) References Cited

U.S. PATENT DOCUMENTS

| | | | |
|---|---|---|---|
| 6,390,224 B1 | 5/2002 | Yoshida | |
| 6,457,925 B1 * | 10/2002 | Genick, II | ............ F16B 41/002 411/339 |
| 7,216,860 B2 | 5/2007 | Budde et al. | |
| 7,461,850 B2 | 12/2008 | Kurth | |
| 8,512,497 B2 | 8/2013 | Madsen et al. | |
| 9,090,289 B2 | 7/2015 | Heise et al. | |
| 2010/0027924 A1 | 2/2010 | Wulf et al. | |
| 2012/0107659 A1 | 5/2012 | Phlegm et al. | |
| 2013/0149491 A1 | 6/2013 | Wakeman et al. | |

FOREIGN PATENT DOCUMENTS

| | | |
|---|---|---|
| DE | 10 2012 213 663 A1 | 2/2014 |
| EP | 1 005 697 A1 | 6/2000 |
| EP | 2 092 208 A1 | 8/2009 |
| EP | 2 578 473 A1 | 4/2013 |
| JP | H02-105074 A | 4/1990 |
| JP | 2011-102033 A | 5/2011 |
| JP | 2014-502232 A | 1/2014 |
| WO | WO 99/09563 A1 | 2/1999 |
| WO | WO 03/039893 A1 | 5/2003 |
| WO | WO 2008/058912 A1 | 5/2008 |

OTHER PUBLICATIONS

Plasticomp LLC, "Complet Composite Pellets Property Data", Nov. 2009, 1 page.

English language abstract and machine-assisted English translation for DE 10 2010 005 005 extracted from espacenet.com database on Jan. 4, 2017, 16 pages.

English language abstract and machine-assisted English translation for DE 10 2011 005 564 extracted from espacenet.com database on Jan. 4, 2017, 8 pages.

English language abstract and machine-assisted English translation for DE 10 2012 213 663 extracted from espacenet.com database on Jan. 4, 2017, 21 pages.

English language abstract not found for EP 1 005 697; however, see English language equivalent WO 99/09563. Original document extracted from espacenet.com database on Jan. 4, 2017, 1 page.

English language abstract not found for EP 2 092 208; however, see machine-assisted English language translation of equivalent WO 2008/058912. Original document extracted from espacenet.com database on Jan. 4, 2017, 1 page.

English language abstract and machine-assisted English translation for EP 2 578 473 extracted from espacenet.com database on Jan. 4, 2017, 12 pages.

English language abstract for JP 2011-102033 extracted from espacenet.com database on Jan. 4, 2017, 2 pages.

English language abstract not found for JP 2014-502232; however, see English language equivalent U.S. Pat. No. 9,090,289. Original document extracted from espacenet.com database on Jan. 4, 2017, 17 pages.

English language abstract for WO 03/039893 extracted from espacenet.com database on Jan. 4, 2017, 1 page.

English language abstract and machine-assisted English translation for WO 2008/058912 extracted from espacenet.com database on Jan. 4, 2017, 23 pages.

Communication pursuant to Article 94(3) EPC from corresponding European Patent Application No. 15 734 808.7 dated Feb. 5, 2018.

First Office Action from counterpart Chinese Patent Application No. 2015800460900 dated Aug. 30, 2018, and its English translation.

Second Office Action from counterpart Chinese Patent Application No. 2015800460900 dated Jun. 5, 2019, and its English translation.

Office Action from counterpart Japanese Patent Application No. 2016-575861 dated Jul. 1, 2019, and its English translation.

\* cited by examiner

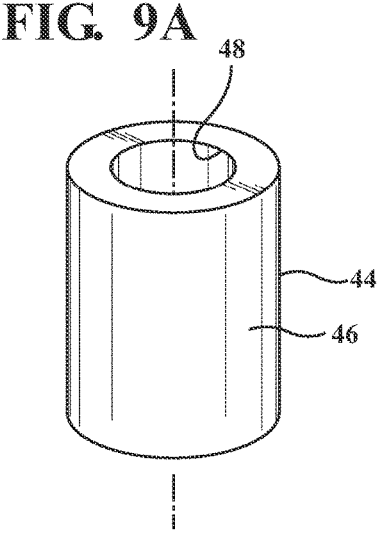
FIG. 9A
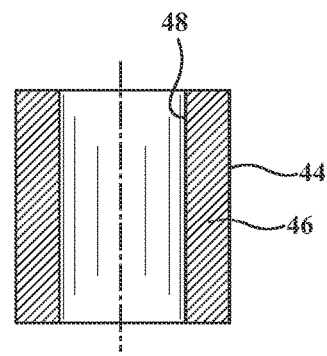
FIG. 9B
FIG. 9C
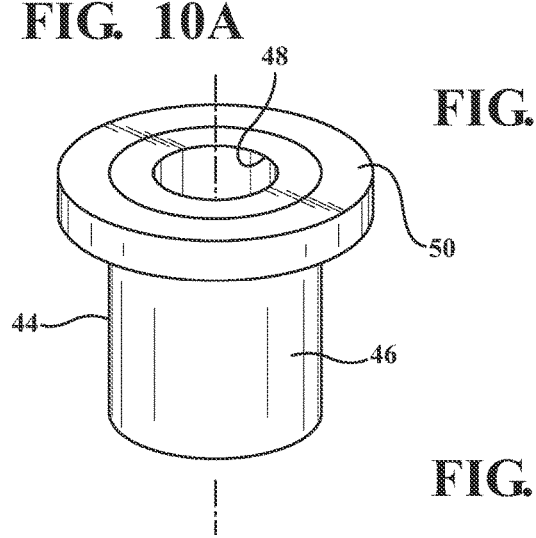
FIG. 10A
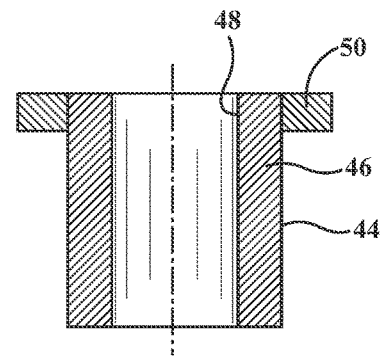
FIG. 10B
FIG. 10C

COMPOSITE THERMOPLASTIC STRUCTURE AND COMPOSITE COMPRESSION LIMITER FOR SAME

CROSS-REFERENCE TO RELATED APPLICATIONS

The present application is the National Stage of International Patent Application No. PCT/US2015/038328, filed on Jun. 29, 2015, which claims priority to and all the benefits of U.S. Provisional Patent Application No. 62/019,042, filed on Jun. 30, 2014, which is hereby expressly incorporated herein by reference in its entirety.

BACKGROUND OF THE INVENTION

1. Field of the Invention

The present invention relates generally to vehicles and, more particularly, to a thermoplastic structure and compression limiter for a vehicle.

2. Description of the Related Art

It is known to provide a structure such as a sub-frame for a vehicle. Typically, the sub-frame includes a plurality of components that are made of a metal material such as steel and welded together to form the sub-frame. The sub-frame is attached to a frame of the vehicle by suitable fasteners such as metal bolts. The sub-frame must meet structural requirements by having sufficient stiffness to support repeated loads commonly exerted by the vehicle. The sub-frame must also have sufficient impact strength to withstand cracking or breaking during impacts of the vehicle during crash events. Steel meets the structural requirements by providing sufficient stiffness and sufficient impact strength to satisfy the above requirements. However, the steel sub-frame is comprised of several individual components and the assembly of these components makes such a construction relatively expensive. Additionally, steel is a relatively heavy material, resulting in a relatively large mass.

Due to stringent fuel economy standards, vehicle manufactures are demanding mass saving initiatives. As such, there is a demand to reduce the weight of the vehicle, in particular the sub-frame, by utilizing lighter weight materials. However, in so reducing weight, it is necessary that the sub-frame provide sufficient stiffness and sufficient energy management on certain platforms to withstand the loads imposed thereon.

In addition, it is known that compression limiters are used with thermoplastic parts to prevent creep of the thermoplastic material. Typically, these compression limiters are made of metals, e.g., aluminum, steel, etc. In some vehicle applications, many compression limiters may be required. As such, these compression limiters may add substantial additional weight to the vehicle, thereby reducing fuel economy of the vehicle.

It is, therefore, desirable to provide a new composite thermoplastic structure and composite compression limiter for a vehicle. It is also desirable to provide a composite thermoplastic structure and composite compression limiter that meets load and structural requirements of the vehicle. It is further desirable to provide a composite thermoplastic structure and composite compression limiter that reduces weight compared to conventional metal sub-frames and compression limiters for a vehicle. As such, there is a need in the art to provide a composite thermoplastic structure and composite compression limiter for a vehicle that meets at least one of these desires.

SUMMARY OF THE INVENTION

Accordingly, the present invention is a composite compression limiter including a cylindrical body extending axially with an aperture extending axially therethrough to receive a fastener. The body is made of a polymeric continuous fiber tape reinforced by a plurality of fibers ranging from approximately 20% to approximately 65% by weight.

In addition, the present invention is a composite thermoplastic structure of a vehicle including a thermoplastic sub-frame adapted to receive at least one fastener and at least one compression limiter mounted to the thermoplastic sub-frame and adapted to be disposed about the at least one fastener. The thermoplastic sub-frame is made of a polymeric material and a polymeric continuous fiber reinforcing tape and the at least one compression limiter is made of a polymeric tape reinforced by a plurality of fibers.

One advantage of the present invention is that a new composite thermoplastic structure and composite compression limiter are provided for a vehicle to reduce the weight thereof. Another advantage of the present invention is that the composite thermoplastic structure meets load and structural requirements for static and dynamic stiffness, braking, cornering, fatigue, impact, etc. of the vehicle. Yet another advantage of the present invention is that the composite thermoplastic structure uses structural ribs to distribute the loads throughout the sub-frame of the vehicle. Still another advantage of the present invention is that the composite thermoplastic structure incorporates composite compression limiters to help support loads in high stress areas. A further advantage of the present invention is that the composite compression limiters are made of a non-metal light-weight material. Yet a further advantage of the present invention is that the composite thermoplastic structure reduces weight compared to conventional metal sub-frames, thereby helping to increase fuel economy of the vehicle. Still a further advantage of the present invention is that the composite compression limiter is a lightweight solution versus metal compression limiters. Another advantage of the present invention is that the composite compression limiter eliminates galvanic corrosion when using carbon fiber filled materials. Yet another advantage of the present invention is that the composite compression limiter improves creep performance of the thermoplastic structure. Still another advantage of the present invention is that the composite compression limiters reduce fastener relaxation over time.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 9A is a perspective view of one embodiment of a composite compression limiter, according to the present invention, of the composite thermoplastic structure of FIGS. 1 through 6.

FIG. 9B is a sectional view of the composite compression limiter of FIG. 9A.

FIG. 9C is a top view of the composite compression limiter of FIG. 9A.

FIG. 10A is a perspective view of another embodiment of a composite compression limiter, according to the present invention, of the composite thermoplastic structure of FIGS. 1 through 6.

FIG. 10B is a sectional view of the composite compression limiter of FIG. 10A.

FIG. 10C is a top view of the composite compression limiter of FIG. 10A.

DETAILED DESCRIPTION OF THE PREFERRED EMBODIMENT(S)

Figure 1:
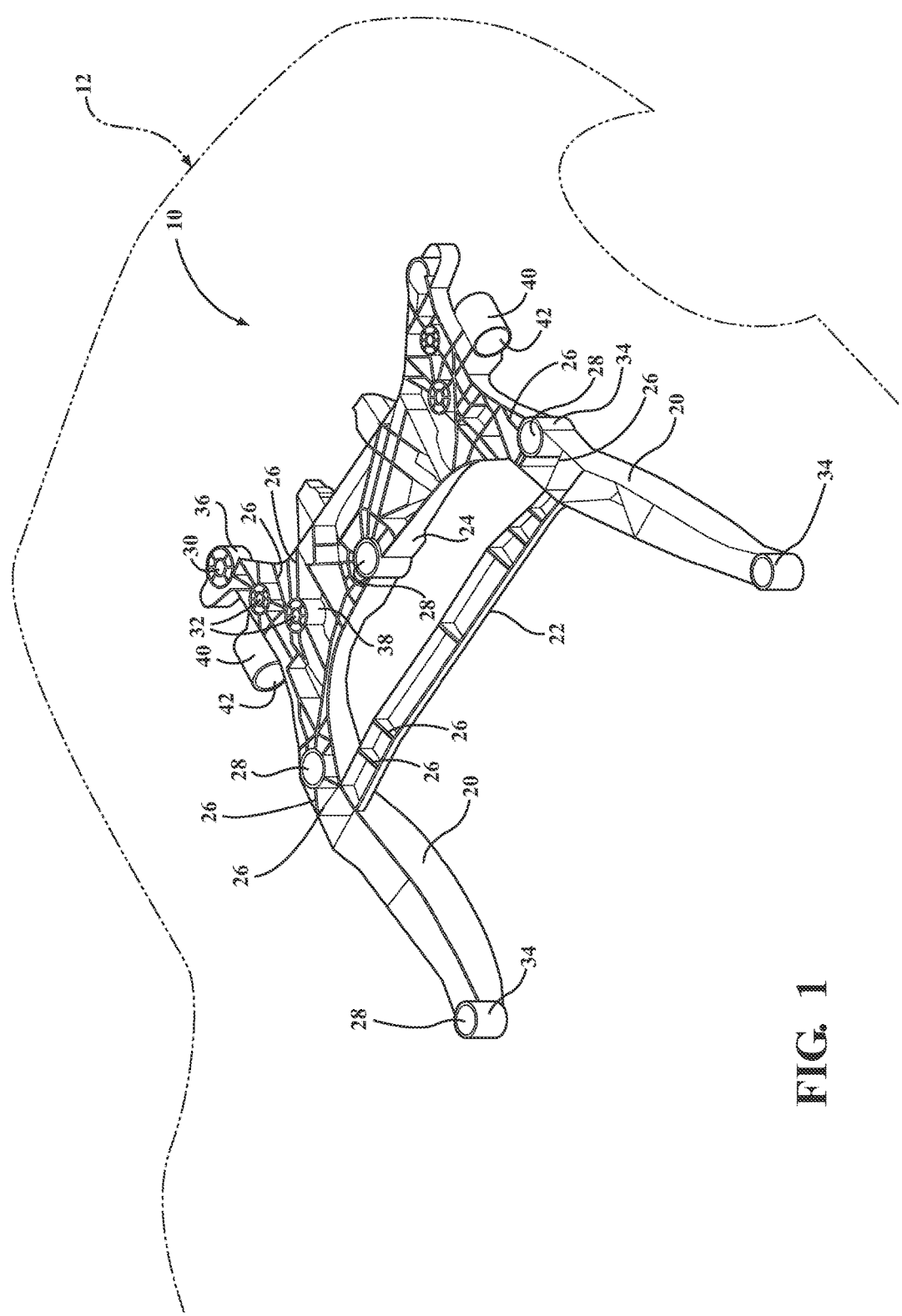
FIG. 1 is a bottom perspective view of one embodiment of a composite thermoplastic structure, according to the present invention, illustrated with a portion of a vehicle in phantom.
Figure 2:
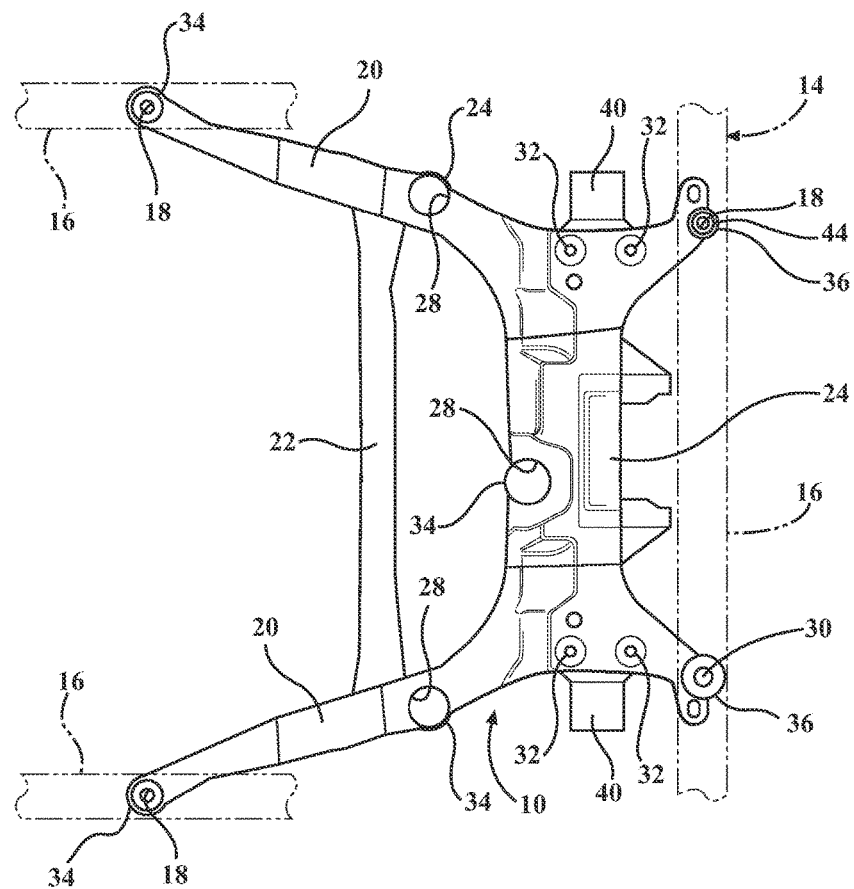
FIG. 2 is a top view of the composite thermoplastic structure of FIG. 1 illustrating a frame of the vehicle in phantom.

Referring to the Figures, wherein like numerals indicate like parts throughout the several views, one embodiment of a composite thermoplastic structure, according to the present invention, is shown generally at 10 for a vehicle, generally indicated 12, a portion of which is illustrated in phantom lines in FIG. 1. Referring to FIG. 2, the composite thermoplastic structure 10 is configured to mount a frame, generally indicated at 14 and in phantom lines, of the vehicle 12. The frame 14 includes a plurality of rails 16 extending longitudinally and laterally or transversely. In one embodiment, the composite thermoplastic structure 10 is a front sub-frame that is mounted to the rails 16 of the frame 14 of the vehicle 12 by a suitable mechanism such as fasteners 18. It should be appreciated that the fasteners 18 are made of metal and known in the art. It should also be appreciated that the frame 14 may be made of a stiff material such as steel.

Referring to FIGS. 1 through 6, the composite thermoplastic structure 10 includes a plurality of, preferably two, side portions 20 spaced laterally and extending longitudinally. The composite thermoplastic structure 10 also includes a plurality of, preferably two, transverse portions 22 and 24 spaced longitudinally and extending laterally. A rear transverse portion 22 extends laterally between and is connected to the side portions 20. A front transverse portion 24 extends laterally between and is connected to front ends of the side portions 20. As illustrated in FIG. 1, the composite thermoplastic structure 10 includes a plurality of ribs 26 disposed within and connected to or integrated with the side portions 20 and transverse portions 22 and 24. The composite thermoplastic structure 10 further includes a plurality of apertures 28, 30, and 32 extending through the side portions 20 and transverse portion 24. A first plurality of apertures 28 are formed by generally cylindrical sleeves 34. A second plurality of apertures 30 are formed by generally cylindrical sleeves 36. A third plurality of apertures 32 are formed by generally cylindrical sleeves 38. In one embodiment, the apertures 28 have a diameter greater than a diameter of the apertures 30 and 32 and the apertures 30 have a diameter greater than a diameter of the apertures 32. The sleeves 34, 36, and 38 are connected to or integrated with the side portions 20 and transverse portion 24. The composite thermoplastic structure 10 is integral and one-piece.

The composite thermoplastic structure 10 may include one or more lower control arm mounts 40 disposed along the side portions 20. The lower control arm mounts 40 are generally cylindrical sleeves having an aperture 42 extending axially therethrough. The lower control arm mounts 40 are connected to or integrated with the side portions 20.

The composite thermoplastic structure 10 further includes a plurality of composite compression limiters 44 disposed in the apertures 28, 30, and 32 and about the fasteners 18. As illustrated in FIG. 2, one of the composite compression limiters 44 is disposed in one of the apertures 28, 30, and 32 and about one of the fasteners 18. In one embodiment illustrated in FIGS. 9A through 9C, each of the composite compression limiters 44 have a cylindrical body 46 extending axially with an aperture 48 extending axially therethrough to receive one fastener 18 to attach the composite thermoplastic structure 10 to the frame 14 of the vehicle 12. The body 46 and aperture 48 are generally circular in shape, but may be any suitable shape. The body 46 has a thickness of approximately 4 millimeters, but may have any suitable thickness. It should be appreciated that the body 46 is integral and forms a one-piece member. It should also be appreciated that the composite compression limiter 44 of this embodiment may be used in other locations and/or applications of the vehicle 12 in addition to the composite thermoplastic structure 10.

In another embodiment illustrated in FIGS. 10A through 10C, the composite compression limiter 44 includes at least one flange 50 extending radially outwardly from the body 46. As illustrated, the flange 50 is located at one axial end of the body 46. The body 46 and aperture 48 are generally circular in shape, but may be any suitable shape. In one embodiment, the flange 50 has a generally circular shape, but may have any suitable shape. The body 46 has a thickness of approximately 4 millimeters, but may have any suitable thickness. It should be appreciated that the body 46 and flange 50 are integral and may form a one-piece member. It should also be appreciated that the composite compression limiter 44 of this embodiment may be used in other locations and/or applications of the vehicle 12 in addition to the composite thermoplastic structure 10.

Figure 11A:
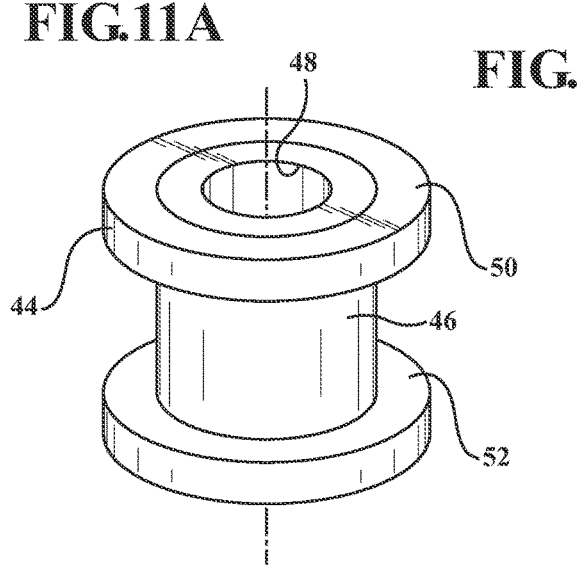
FIG. 11A is a perspective view of yet another embodiment of a composite compression limiter, according to the present invention, of the thermoplastic structure of FIGS. 1 through 6.
Figure 11B:
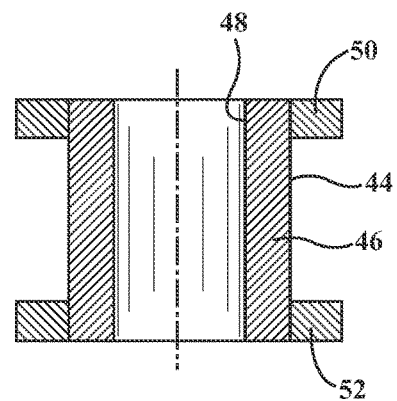
FIG. 11B is a sectional view of the composite compression limiter of FIG. 11A.
Figure 11C:
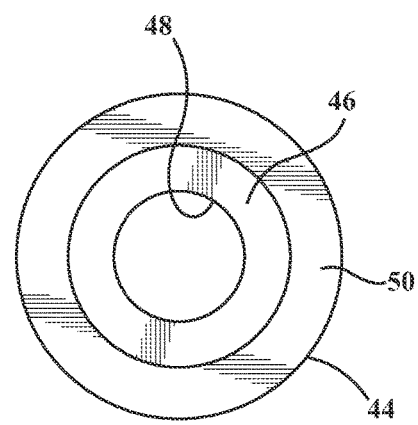
FIG. 11C is a top view of the composite compression limiter of FIG. 11A.

In yet another embodiment illustrated in FIGS. 11A through 11C, the composite compression limiter 44 includes a plurality of flanges 50 and 52 extending radially outwardly from the body 46. As illustrated, the flange 50 is located at one axial end of the body 46 and the flange 52 is located at the other axial end of the body 46. The body 46 and aperture 48 are generally circular in shape, but may be any suitable shape. In one embodiment, the flanges 50 and 52 have a generally circular shape, but may have any suitable shape. The body 46 has a thickness of approximately 3 millimeters to approximately one inch, but may have any suitable thickness. In one embodiment, the flanges 50 and 52 and the body 46 have a non-smooth surface and/or a non-circular shape to minimize rotation of the composite compression limiters 44. The composite compression limiters 44 are made as one-piece, or using two composite compression limiters 44 as illustrated in FIG. 10A, of a composite material. In one embodiment, the composite compression limiters 44 are overmolded with the composite thermoplastic structure 10 to be integral therewith. It should be appreciated that the body 46 and flanges 50 and 52 are integral and may form a one-piece member. It should also be appreciated that the composite compression limiters 44 limit compression on the composite thermoplastic structure 10 by the fasteners 18. It should further be appreciated that the composite compression limiters 44 are used at fastener fastening points of the composite thermoplastic structure 10 to the frame 14 of the vehicle 12. It should also be appreciated that the composite compression limiter 44 of this embodiment may be used in other locations and/or applications of the vehicle 12 in addition to the composite thermoplastic structure 10.

Figure 13A:
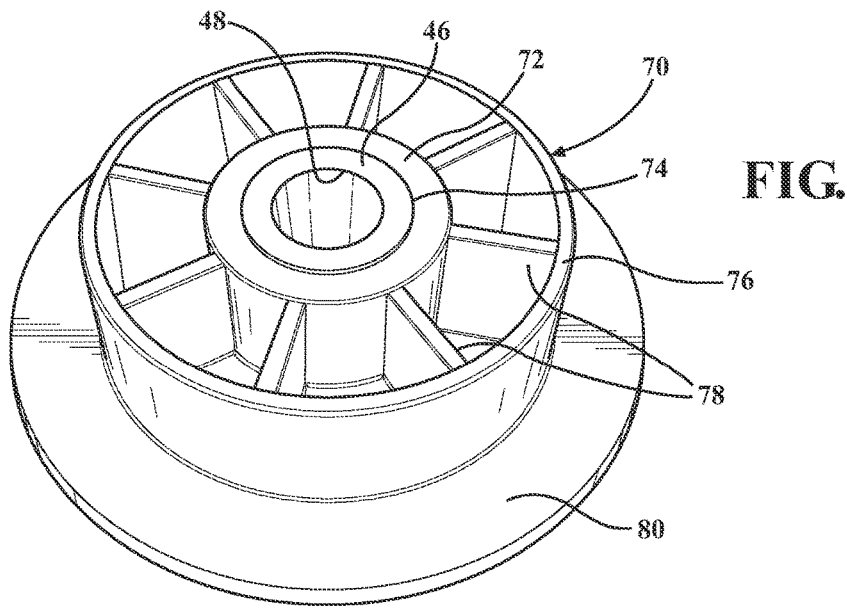
FIG. 13A is a perspective view of still another embodiment, according to the present invention, of the composite thermoplastic structure of FIGS. 1 through 6.
Figure 13B:
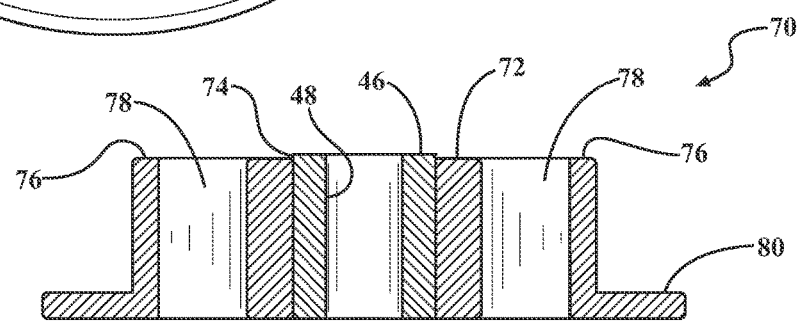
FIG. 13B is a sectional view of the composite compression limiter of FIG. 13A.
Figure 13C:
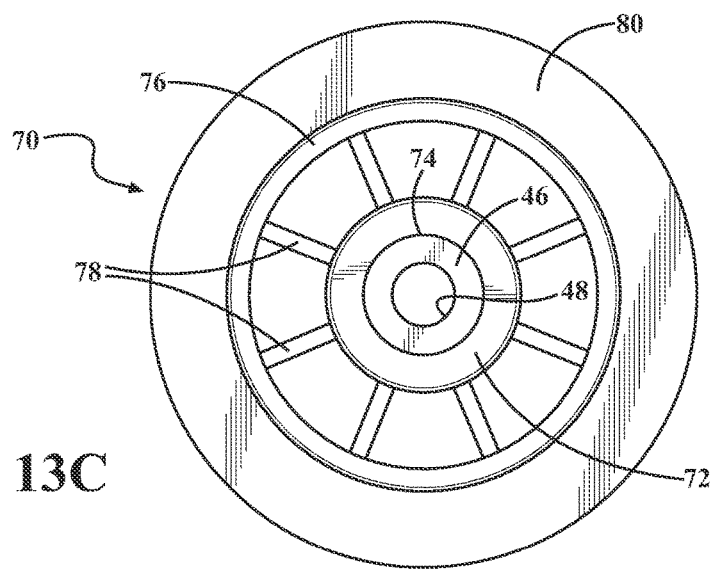
FIG. 13C is a top view of the composite compression limiter of FIG. 13A.

In still embodiment illustrated in FIGS. 13A through 13C, the composite compression limiter 44 has a cylindrical body 46 extending axially with an aperture 48 extending axially therethrough to receive one fastener 18 to attach the composite thermoplastic structure 10 to the frame 14 of the vehicle 12. The body 46 and aperture 48 are generally circular in shape, but may be any suitable shape. The body 46 has a thickness of approximately 4 millimeters, but may have any suitable thickness. In one embodiment, the composite compression limiter 44 includes a housing, generally indicated at 70, disposed about the body 46. The housing 70 includes a generally cylindrical inner body 72 extending axially with an aperture 74 extending axially therethrough to receive the body 46. The housing 70 also includes a generally cylindrical outer body 76 spaced radially from the inner body 72 and one or more ribs 78 extending radially between and spaced circumferentially about the inner body 72 and the outer body 76. The housing 70 further includes a flange 80 having a generally circular shape, but may have any suitable shape, extending radially either from the inner body 72 and/or outer body 76 and radially beyond the outer body 76. The housing 70 is made of a plastic material, composite material, etc. and may have any suitable thickness. The housing 70 may be integral, unitary, and formed as a one-piece member. The composite compression limiter 44 and housing 70 may be made as one-piece or as two separate pieces. In one embodiment, the composite compression limiters 44 are overmolded with the housing 70 to be integral therewith. It should be appreciated that the composite compression limiter 44 of this embodiment may be used in other locations and/or applications of the vehicle 12 in addition to the composite thermoplastic structure 10.

Figure 6:
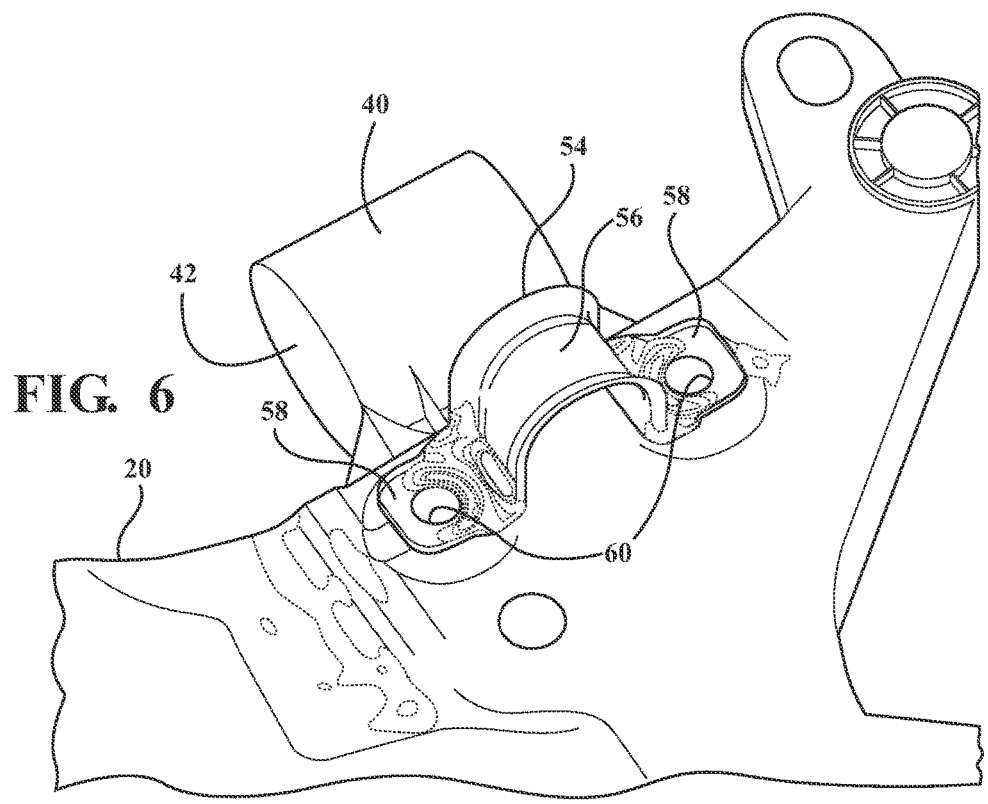
FIG. 6 is an enlarged perspective view of a stabilizer link bracket, according to the present invention, and a portion of the composite thermoplastic structure of FIG. 1.
Figure 7:
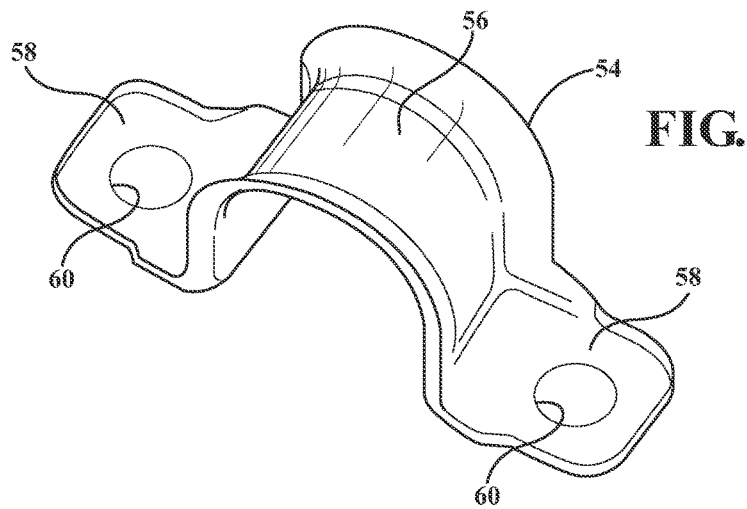
FIG. 7 is a perspective view of the stabilizer link bracket of FIG. 6.

Referring to FIGS. 6 and 7, the thermoplastic structure 10 may include one or more clips or stabilizer link brackets 54, according to the present invention, bolted by the fasteners 18 to the frame 14 of the vehicle 12. The stabilizer link bracket 54 includes a body portion 56 having a generally inverted "U" shape and a plurality of flanges 58 extending outwardly from the body portion 56. In one embodiment, one flange 58 extends outwardly from one end of each end of the body portion 56. Each flange 58 includes an aperture 60 extending therethrough to receive one of the fasteners 18. The stabilizer link bracket 54 is made of a rigid material such as steel. The stabilizer link bracket 54 is integral, unitary, and formed as one-piece.

Figure 7A:
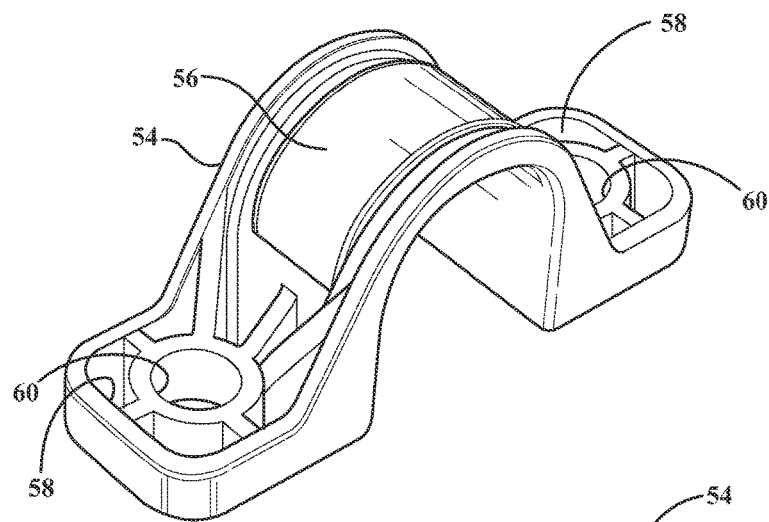
FIG. 7A is a perspective view of another embodiment, according to the present invention, of the stabilizer link bracket of FIG. 6.

Referring to FIG. 7A, another embodiment, according to the present invention, of the stabilizer link bracket 54 is shown. Like parts of the stabilizer link bracket 54 have like reference numerals. In this embodiment, the stabilizer link bracket 54 is a composite structure made using continuous fiber reinforced unidirectional (UD) tape. The stabilizer link bracket 54 includes a body portion 56 having a generally inverted "U" shape and a plurality of flanges 58 extending outwardly from the body portion 56. In one embodiment, one flange 58 extends outwardly from one end of each end of the body portion 56. Each flange 58 includes an aperture 60 extending therethrough to receive one of the fasteners 18. The body portion 56 of the stabilizer link bracket 54 includes a plurality of ply laminae. The laminae are ply orientated at predetermined angles. It should be appreciated that the stabilizer link brackets 54 comprise a material with a compressive strength for preventing the stabilizer link brackets 54 from being compressed by the fasteners 18.

Figure 8:
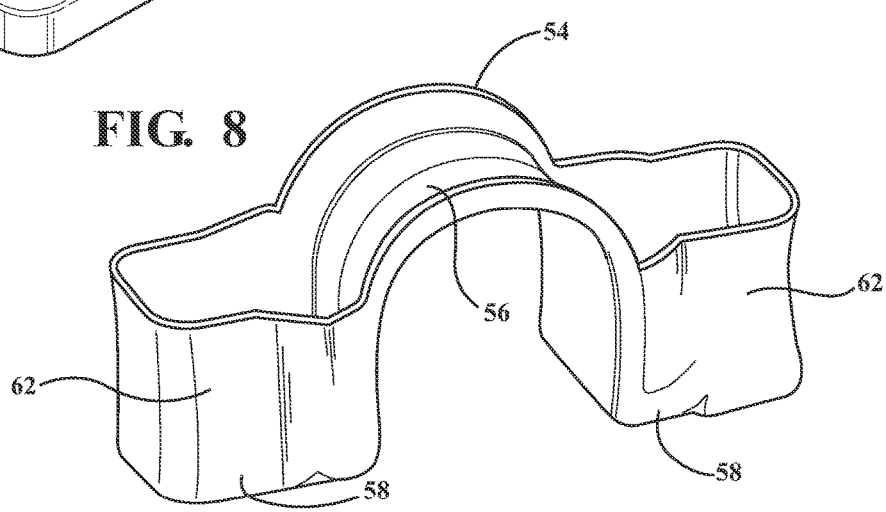
FIG. 8 is a perspective view of yet another embodiment, according to the present invention, of the stabilizer link bracket of FIG. 6.

Referring to FIG. 8, yet another embodiment, according to the present invention, of the stabilizer link bracket 54 is shown. Like parts of the stabilizer link bracket 54 have like reference numerals. In this embodiment, the stabilizer link bracket 54 includes a body portion 56 having a generally inverted "U" shape and a plurality of flanges 58 extending outwardly from the body portion 56. In one embodiment, one flange 58 extends outwardly from one end of each end of the body portion 56. Each flange 58 includes an aperture 60 extending therethrough to receive one of the fasteners 18. Each flange 58 also includes a wall 62 extending upwardly to create a cavity or socket around the flange 58. The stabilizer link bracket 54 may be made of a rigid material such as steel or composite structure made using continuous fiber reinforced unidirectional (UD) tape.

Figure 12:
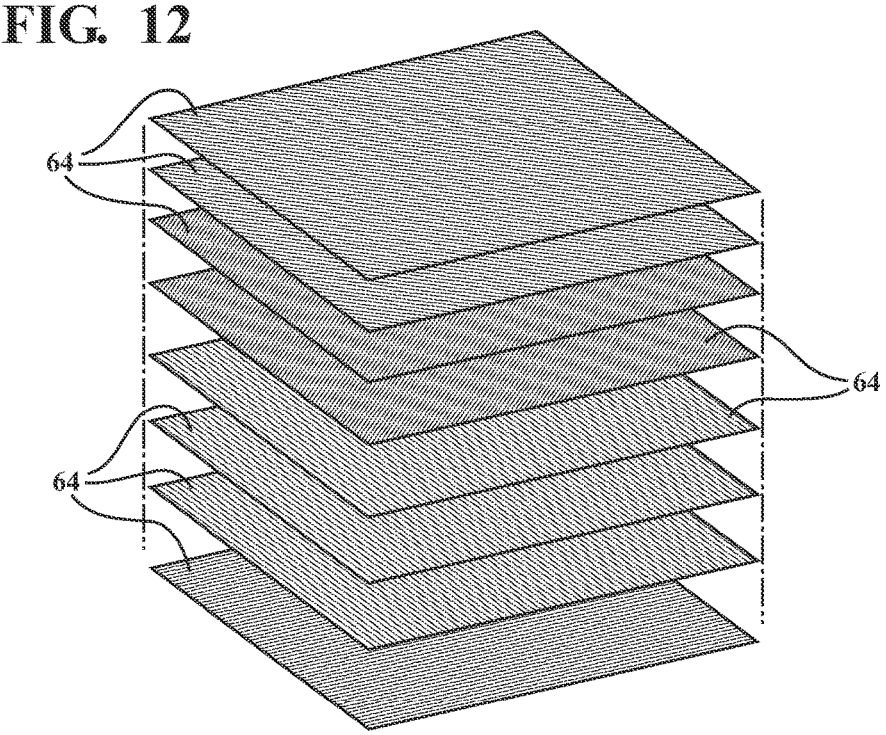
FIG. 12 is a perspective view of ply laminae used to form the composite compression limiters of FIGS. 9A through 11C.

Referring to FIG. 12, the composite compression limiters 44 are made using continuous fiber reinforced unidirectional (UD) tape. The body 46 of the composite compression limiter 44 includes a plurality of ply laminae 64. In one embodiment, the laminae 64 are twelve (12) in number. In another embodiment, the laminae 64 are sixteen (16) in number. In the embodiment illustrated in FIG. 12, the laminae 64 are ply orientated with one at zero degrees, three at positive ninety degrees, two at positive forty-five degrees, and two at negative forty-five degrees, the orientation being repeated for remaining laminae 64. In another embodiment, the laminae 64 are ply orientated with one at positive forty-five degrees, one at positive ninety degrees, one at negative forty-five degrees, one at zero degrees, one at positive forty-five degrees, and one at negative forty-five degrees, the orientation being repeated for remaining laminae 64. In yet another embodiment, the laminae 64 are ply orientated with one at positive ten degrees, one at positive forty-five degrees, two at positive ninety degrees, one at negative forty-five degrees, and one at negative ten degrees, the orientation being repeated for remaining laminae 64. In still another embodiment, the laminae 64 are ply orientated with one at positive forty-five degrees, one at zero degrees, two at positive ninety degrees, one at zero degrees, and one at negative forty-five degrees, the orientation being repeated for remaining laminae 64. It should be appreciated that the forty-five degree ply orientation mitigates buckling because of the fibers. It should also be appreciated that the composite compression limiters 44 comprise a material with a compressive strength for preventing the composite thermoplastic structure 10 from being compressed by the fasteners 18.

Figure 14:
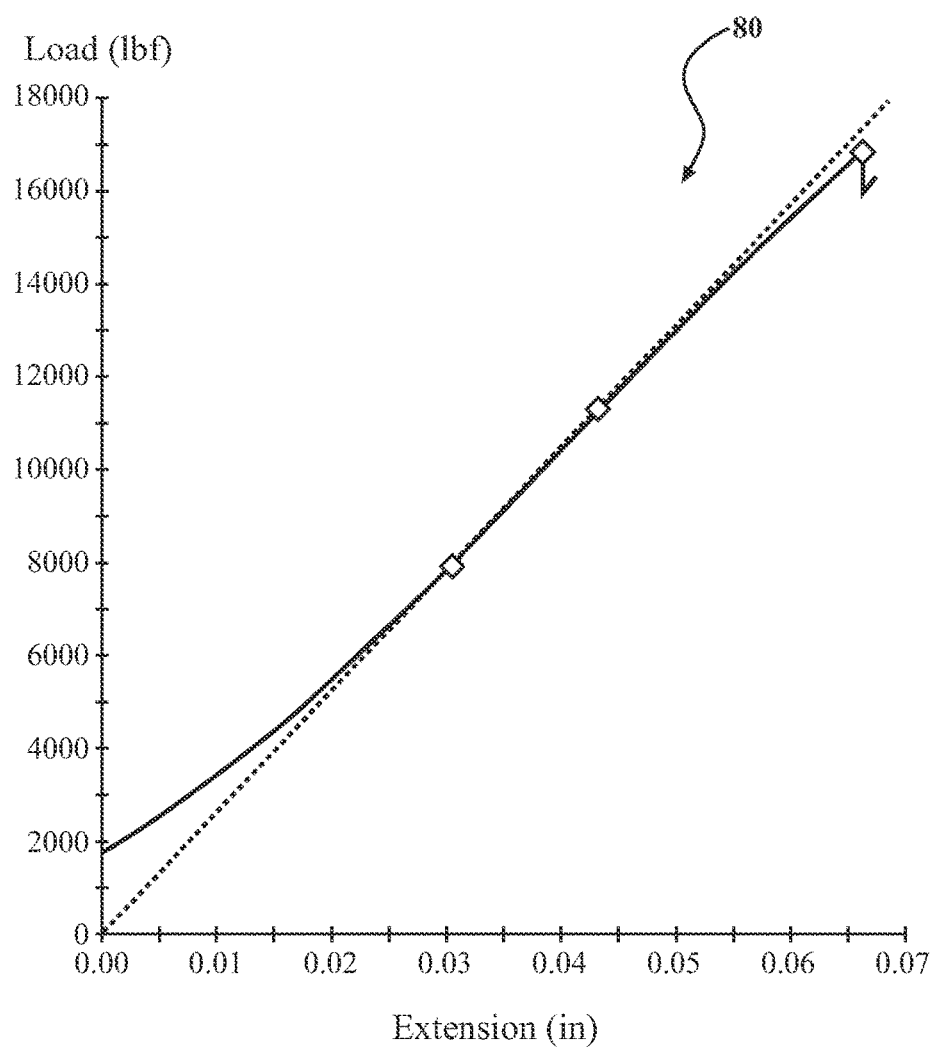
FIG. 14 is a graphical view of load versus extension for a compression test on the composite compression limiter of FIGS. 13A through 13C.

Referring to FIG. 14, a graph 80 of load versus extension is shown for a compression test on the composite compression limiters 44 of FIGS. 13A through 13C is shown. The load was a 10,000 lb. compression load cell on the composite compression limiters 44. As illustrated in the graph 80, the peak load was 16,808.410 pounds force (lbf) with an elongation at peak of 0.066 inches. It should be appreciated that the load was in compression.

Figure 3:
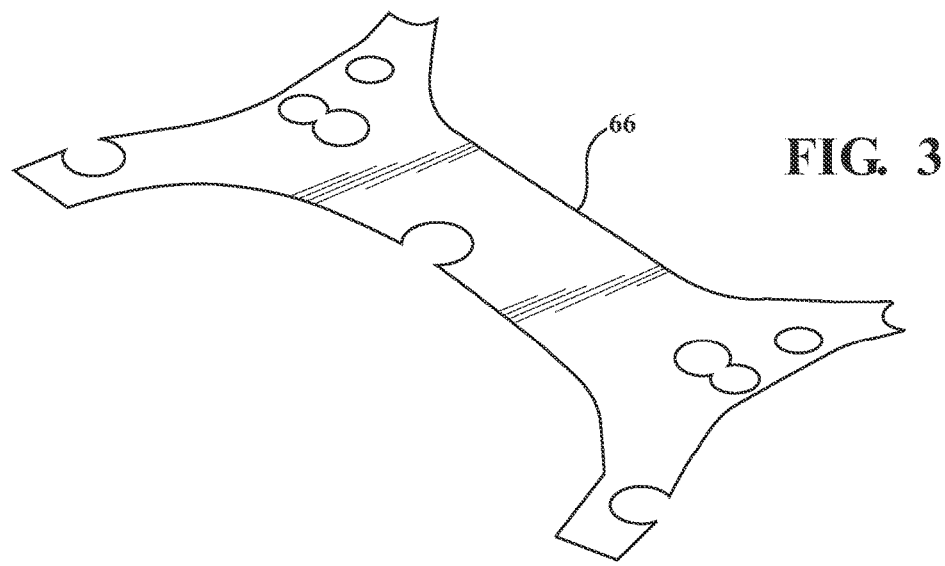
FIG. 3 is a perspective view of a portion of the composite thermoplastic structure of FIG. 1.
Figure 4:
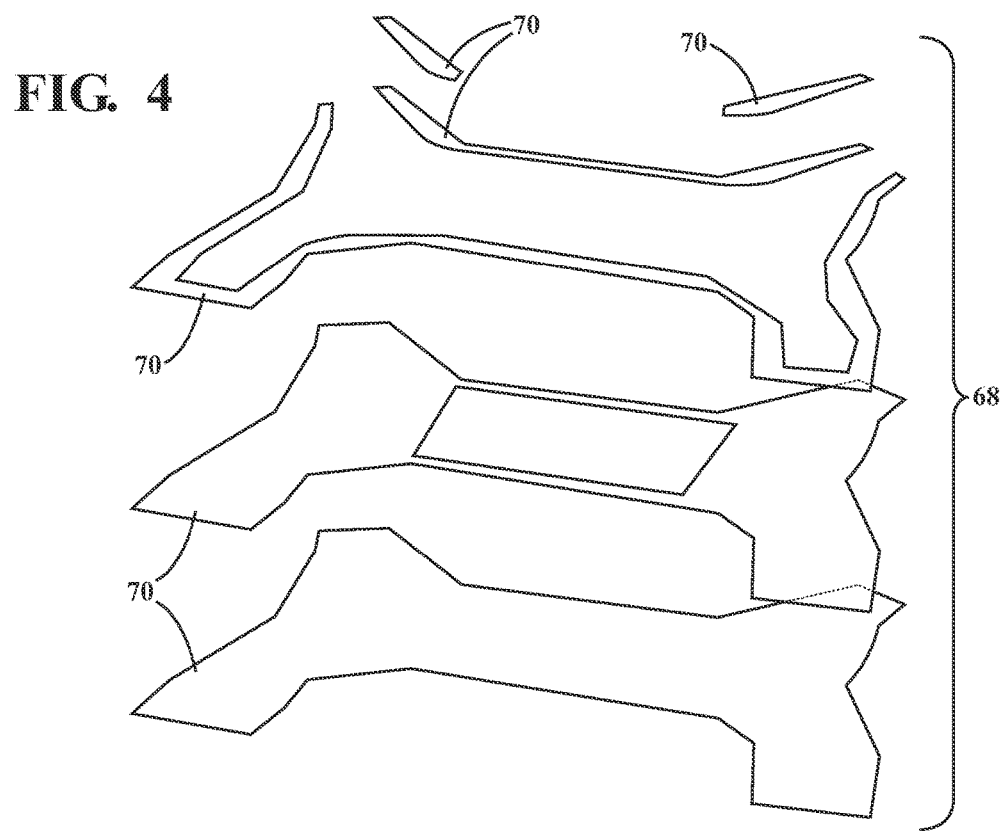
FIG. 4 is an exploded view of another portion of the composite thermoplastic structure of FIG. 1.
Figure 5:
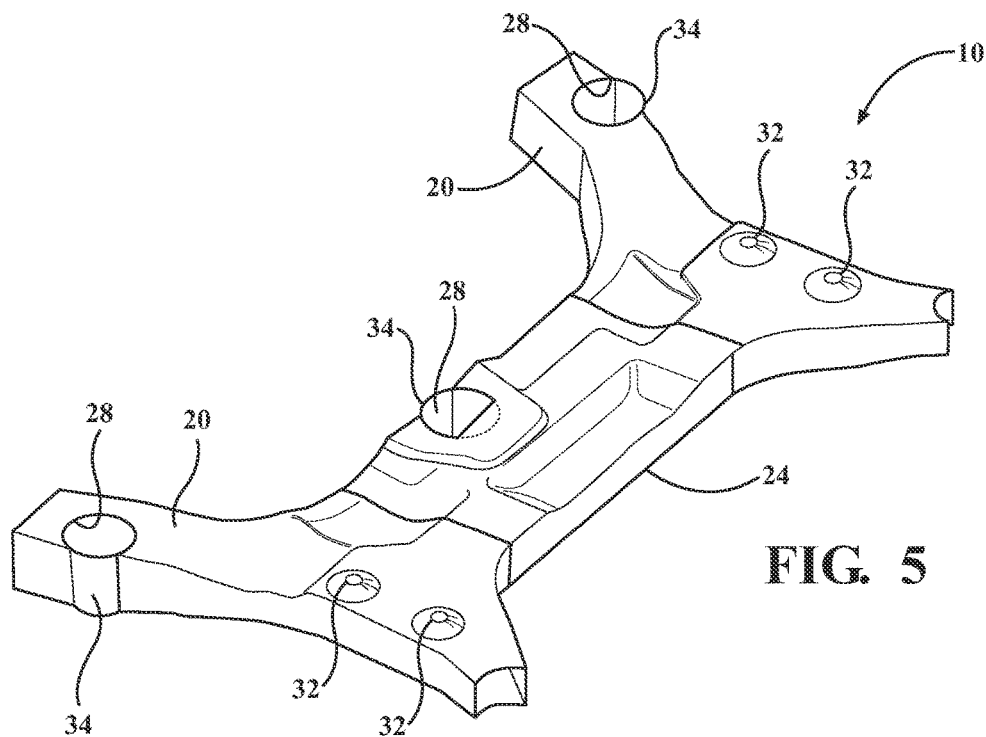
FIG. 5 is a perspective view of yet another portion of the composite thermoplastic structure of FIG. 1.

The composite thermoplastic structure 10 is a composite structure made of a polymeric material and a unidirectional (UD) tape. As illustrated in FIGS. 3 and 4, the thermoplastic structure 10 is formed with two tailored blanks 66 and 68 with variable thickness to form a top and bottom half. Typically, the thickness may range from approximately 1.00 millimeters to approximately 25.40 millimeters, more typically from approximately 1.50 millimeters to approximately 12.70 millimeters, more typically from approximately 2.38 millimeters to approximately 5.44 millimeters. The tailored blanks 66 and 68 enable placement of the UD tape in areas needed and avoids the excessive use of material. As illustrated in FIG. 4, the blank 68 of the composite thermoplastic structure 10 is separated into laminate layers 70.

In one embodiment, the composite thermoplastic structure 10 is made of a polymeric material reinforced by a plurality of fibers ranging from approximately 20% to approximately 65% by weight. The fibers are either a glass or carbon based material. The fibers are long fibers, short fibers, continuous fibers, or a combination of continuous, long, and/or short fibers. In one embodiment, the polymeric material is PA66 or PA6 nylon with approximately 50% long carbon fibers. In one embodiment, the UD tape is a carbon fiber tape. In one embodiment, the UD tape is a UD carbon fiber PA 66 nylon tape. In one embodiment, the tape is an UltraTape™ CF or UltraLaminate™ CF. The UD tape is formed as an inner structure that is overmolded with the polymeric material. It should be appreciated that carbon has a high stiffness and a UD carbon fiber tape has a higher stiffness and strength than a UD glass fiber tape. It should be appreciated that the composite compression limiters 44 using glass continuous fibers will act as a barrier between the carbon fiber material of the composite thermoplastic structure 10 and the fasteners 18 of the vehicle 12. It should be appreciated that the UD carbon fiber PA 66 nylon tape is commercially available from BASF under the tradename UltraTape™ CF or UltraLaminate™ CF PA 66. It should be appreciated that the thermoplastic design facilitates welding.

The polymeric material is a thermoplastic material for allowing injection molding. The polymeric material is at least one selected from the group of polyester, polyamide, polyethylene terephthalate, polyvinyl butyral, acrylonitrile, butadiene styrene, polymethyl methacrylate, cellulose acetate, cyclic olefin copolymers, ethylene vinyl acetate, ethylene vinyl alcohol, fluoropolymers, polyoxymethylene, polyacrylates, polyacrylonitrile, polyaryletherketone, polyamide-imide, polybutadiene, polybutylene terephthalate, polycaprolactone, polycyclohexylene dimethylene, polyhydroxyalkanoates, polyketone, polyetheretherketone, polyetherimide, polycarbonate, polyethylene, polyimide, polylactic acid, polymethylpentene, polyphenylene sulfide, polyphenylene oxide, polyphthalamide, polystyrene, polysulfone, polytrimethylene terephthalate, polyurethane, polyvinyl acetate, polyetherketoneketone, chlorinated polyethylene, polylactic acid, polyvinyl chloride, polyvinylidene chloride, and styrene-acrylonitrile, and combinations thereof. In one embodiment, the polymeric material includes impact modifiers. In one embodiment, the polymeric material is commercially available from BASF under the tradename Ultramid® 50% LCF PA66 or PA6.

In operation, the tape is formed as a tailored blank 66, without holes 68, is thermoformed in a compression tool (not shown). The tailored blanks 66 and 68 are disposed in a tape consolidation mold (not shown). The compression limiters 44 may also be disposed in the mold. The polymeric material is injected into the mold to form the thermoplastic structure 10 and the composite compression limiters 44 may be overmolded with the thermoplastic structure 10 to be integral therewith. It should be appreciated that the all rib geometry of the ribs 26 is molded in one part and the close-out panel assembled via a subsequent welding or joining process.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A composite compression limiter comprising:
   a cylindrical body extending axially with an aperture extending axially therethrough to receive a fastener, said body being made of a continuous fiber polymeric tape reinforced by a plurality of fibers ranging from approximately 20% to approximately 65% by weight; and
   a housing disposed about said body, said housing including an inner body disposed about said body, an outer body spaced radially from said inner body, and a plurality of ribs extending radially and spaced circumferentially between said inner body and said outer body.

2. A composite compression limiter as set forth in claim 1 wherein said polymeric tape is a continuous fiber reinforced unidirectional (UD) tape.

3. A composite compression limiter as set forth in claim 1 wherein said body includes a plurality of ply laminae of said polymeric tape.

4. A composite compression limiter as set forth in claim 3 wherein said laminae are ply orientated with one at zero degrees, three at positive ninety degrees, two at positive forty-five degrees, and two at negative forty-five degrees.

5. A composite compression limiter as set forth in claim 3 wherein said laminae are ply orientated with one at positive forty-five degrees, one at positive ninety degrees, one at negative forty-five degrees, one at zero degrees, one at positive forty-five degrees.

6. A composite compression limiter as set forth in claim 3 wherein said laminae are ply orientated with one at positive ten degrees, one at positive forty-five degrees, two at positive ninety degrees, one at negative forty-five degrees, and one at negative ten degrees.

7. A composite compression limiter as set forth in claim 1 including at least one flange extending radially outwardly from said body.

8. A composite compression limiter as set forth in claim 3 wherein said laminae are ply orientated with one at positive forty-five degrees, one at zero degrees, two at positive ninety degrees, one at zero degrees, and one at negative forty-five degrees.

9. A composite compression limiter as set forth in claim 1 wherein said body has a thickness of approximately 3 millimeters to approximately one inch.

10. A composite compression limiter as set forth in claim 7 wherein said body and said flange are integral and formed as a one-piece member.

11. A composite thermoplastic structure of a vehicle comprising: a thermoplastic sub-frame adapted to receive at least one fastener and at least one compression limiter according to claim 1 mounted to said thermoplastic sub-frame and adapted to be disposed about said at least one fastener; and wherein said thermoplastic sub-frame is made of a polymeric material and a polymeric reinforcing tape.

12. A composite thermoplastic structure as set forth in claim 11 wherein said polymeric material is reinforced by a plurality of fibers ranging from approximately 20% to approximately 65% by weight.

13. A composite thermoplastic structure as set forth in claim 12 wherein said fibers are at least one of a glass material and carbon material.

14. A composite thermoplastic structure as set forth in claim 12 wherein said fibers are at least one of long fibers, short fibers, and a combination of long and short fibers.

15. A composite thermoplastic structure as set forth in claim 11 wherein said reinforcing tape is a uni-directional (UD) tape.

16. A composite thermoplastic structure as set forth in claim 11 wherein said UD tape is formed as an inner structure and said polymeric material is overmolded said inner structure.

17. A composite thermoplastic structure as set forth in claim 11 wherein said polymeric material is PA66 or PA6 nylon.

18. A composite thermoplastic structure as set forth in claim 11 wherein said compression limiter is a continuous fiber reinforced unidirectional (UD) tape.

* * * * *